US010950057B2

(12) United States Patent
Rueb et al.

(10) Patent No.: US 10,950,057 B2
(45) Date of Patent: Mar. 16, 2021

(54) VIRTUAL SPATIALLY REGISTERED VIDEO OVERLAY DISPLAY

(71) Applicant: Virtek Vision International ULC, Waterloo (CA)

(72) Inventors: Kurt D. Rueb, Kitchener (CA); Jeffrey B. Erbrecht, Waterloo (CA)

(73) Assignee: VIRTEK VISION INTERNATIONAL, ULC, Waterloo (CA)

( * ) Notice: Subject to any disclaimer, the term of this patent is extended or adjusted under 35 U.S.C. 154(b) by 0 days.

(21) Appl. No.: 16/552,234

(22) Filed: Aug. 27, 2019

(65) Prior Publication Data
US 2019/0385377 A1 Dec. 19, 2019

Related U.S. Application Data

(63) Continuation-in-part of application No. 15/058,867, filed on Mar. 2, 2016, now Pat. No. 10,410,419.

(60) Provisional application No. 62/126,756, filed on Mar. 2, 2015.

(51) Int. Cl.
G06T 19/00 (2011.01)
H04N 9/31 (2006.01)
G06T 7/73 (2017.01)

(52) U.S. Cl.
CPC .............. *G06T 19/006* (2013.01); *G06T 7/73* (2017.01); *H04N 9/3129* (2013.01); *H04N 9/3161* (2013.01); *H04N 9/3185* (2013.01); *H04N 9/3194* (2013.01); *G06T 2219/2004* (2013.01)

(58) Field of Classification Search
CPC . G06T 19/006; G06T 2219/2004; G06T 7/73; H04N 9/3129; H04N 9/3161; H04N 9/3185; H04N 9/3194
See application file for complete search history.

(56) References Cited

U.S. PATENT DOCUMENTS

| 2013/0250094 | A1* | 9/2013 | Rueb | G01B 11/005 348/94 |
| 2013/0265330 | A1* | 10/2013 | Goto | G02B 27/0172 345/632 |
| 2015/0125835 | A1* | 5/2015 | Wittich | A63F 3/0421 434/169 |

(Continued)

Primary Examiner — Francis Geroleo
(74) Attorney, Agent, or Firm — Miller Canfield Paddock and Stone PLC; Gregory D. Degrazia

(57) ABSTRACT

A method of identifying an accurate assembly of a component onto a workpiece to an operator includes the use of a laser projector and a headset or goggles. The laser projector projects laser images relative to the workpiece. The headset or goggles includes an imaging device and a display element. A location of the laser projector, the imaging device and the display element is registered in a common coordinate system relative to the workpiece. The imaging device generates an image of a view of the workpiece appearing in the display element when viewed by the operator though the display element. A computer generated image of the component is overlaid upon the image of the workpiece being disposed in a geometrically accurate location on the image of the workpiece. The image of the workpiece appearing in the display element is registered to the three dimensional coordinate system defined relative to the workpiece.

18 Claims, 3 Drawing Sheets

(56) References Cited

U.S. PATENT DOCUMENTS

2016/0078682 A1* 3/2016 Shikoda ............ G02B 27/0172
                                                                               345/633

\* cited by examiner

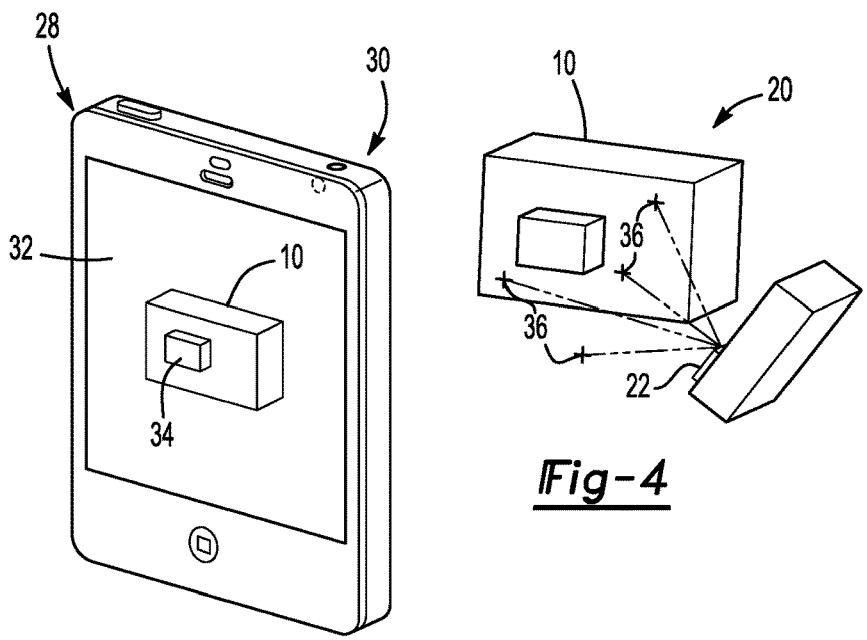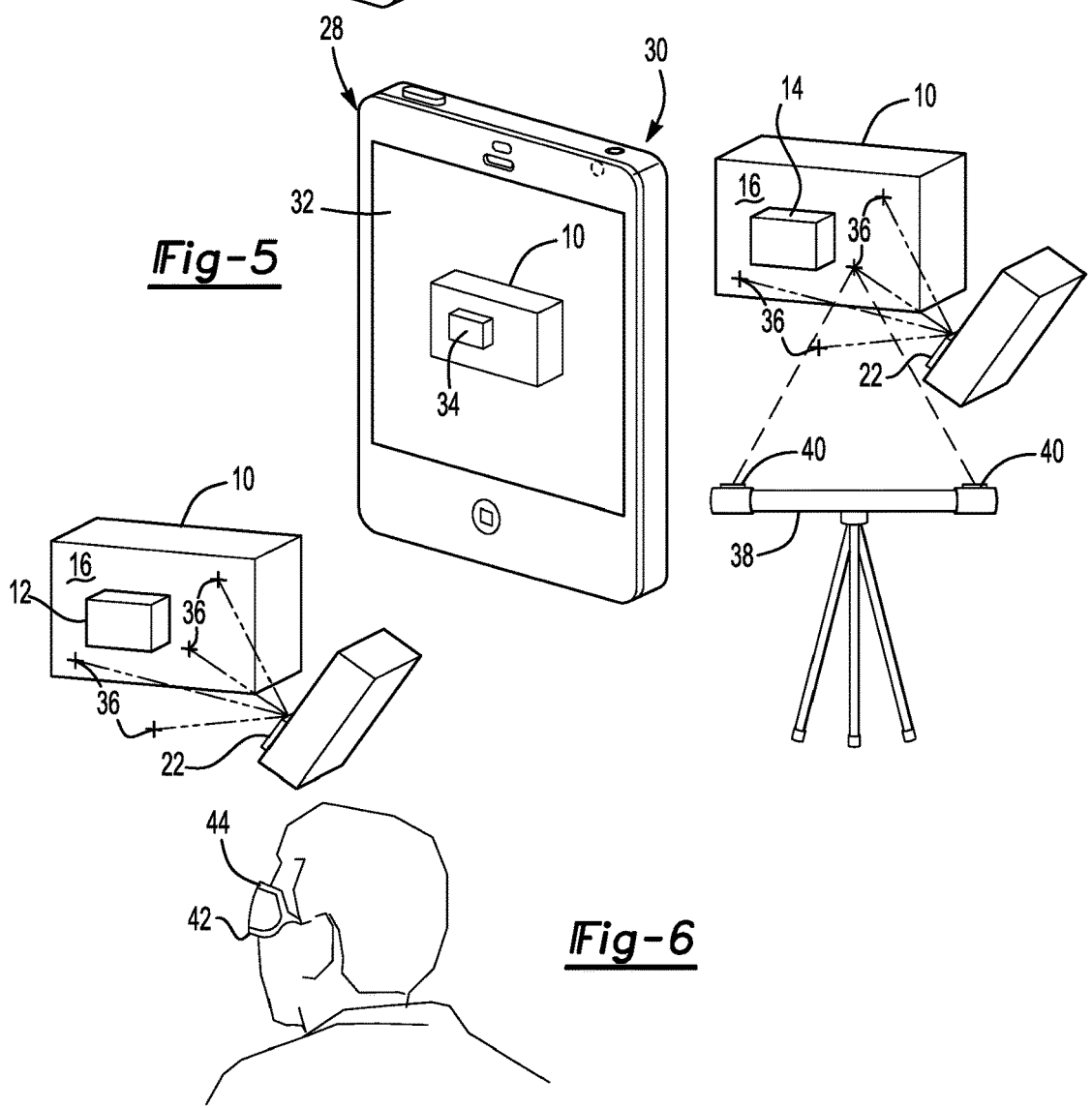

VIRTUAL SPATIALLY REGISTERED VIDEO OVERLAY DISPLAY

PRIOR APPLICATION

The present application claims priority to U.S. patent application Ser. No. 15/058,867 filed on Mar. 2, 2016, which claims priority to U.S. Provisional Patent Application No. 62/126,756 filed on Mar. 2, 2015, the contents of which are included herein by reference.

TECHNICAL FIELD

The present application relates generally to a laser projection and video system for use in an industrial environment. More specifically, the present application relates to the use of an augmented video overlay of a component on a workpiece in an image generated with the assistance of a laser projection system.

BACKGROUND

Manufacturers of complex workpieces and assemblies requiring a high degree of assembly accuracy are continuously looking for improved processes with the use of assembly aids. While conventional manufacturing processes have historically relied on mechanical fixtures as assembly aids that register to a workpiece at a fixed location, these mechanical fixtures have proven difficult to work with and do not provide sufficient accuracy whenever decreasing tolerances are required of complex devices. Alternatively, manual measurement of attachment locations using various reference features or templates applied to the workpiece have also been used. The expense, labor intensive requirements, and propensity for error continue to be a challenge to manufacturing companies.

FIG. 1 shows a schematic view of a workpiece 10. The workpiece 10 includes a component (or subassembly) 12 mated to a surface 16 at a geometrically significant location. As set forth above, accurate location of the component 12 to the workpiece 10 has been achieved with the use of a fixture. Accuracy is particularly inadequate when the fixture is large or heavy making it difficult for an operator to position properly on the workpiece 10.

More recently, optical templates have been projected directly onto workpieces providing an optical image to locate placement a component onto the workpiece 10. This is represented in FIG. 2 where the workpiece 10 is subject to a laser projector 12 that projects a template 14 onto a pre-determined surface 16 of the workpiece. One such example of a laser projector 12 used to project a template 14 onto workpiece 10 is disclosed in U.S. Pat. No. 9,200,899 LASER PROJECTION SYSTEM AND METHOD, the contents of which are incorporated herein by reference. In this example, the position of the projector 12 relative to the workpiece along with a three dimensional geometry of the workpiece and profile of the attachment location are predetermined. Making use of these elements, an outline of an attachment profile in the way of an optical template 14 is accurately projected onto the desired workpiece surface 16.

Systems used to project templates 14 onto a workpiece have proven highly accurate. However, there are limitations to relying merely on a laser projection of a template 13 restricting broader use of optical templates in the marketplace. For example, it is sometimes difficult or impossible to locate a workpiece within a three dimensional coordinate system relative to a laser projector. In addition, arbitrary assembly tasks traditionally make use of mechanical fixtures placed in arbitrary three dimensional locations are not always uniquely suited to laser projection templates 14. In some circumstances, a support surface is available, but the only accurate projection of a profile template is capable upon a first surface of the workpiece. In addition, the three dimensional component affixed to a workpiece prevents projection of a pattern that "looks like" the component when it is necessary to verify correct component selection, placement or orientation.

Projection of a laser template 14 is typically flattened to be received upon a surface of a workpiece. Presently, laser projectors are incapable of providing an accurate focal point at a location spaced from the surface 16 of a workpiece. This prevents projection of a true location of the component according to a computer aided design model that is three dimensional or includes relevant geometrically important features that would be floating in space above the surface 16 of the workpiece 10.

Therefore, it would be desirable to provide a method for overlaying an image of a component to be assembled in a workpiece that provides three dimensional characteristics of that component relative to the workpiece.

SUMMARY

A method of identifying accurate assembly of a component onto a workpiece includes use of a laser projector for projecting a laser image relative to the workpiece. An imaging device generates a video image of the workpiece that is displayed on a display device. The display device generates a video image of the workpiece generated by the imaging device. A laser projector projects a plurality of laser images relative to the workpiece and the display device registers the view of the imaging device relative to the workpiece from the plurality of laser images. The display device generates a virtual image of component upon the video image of the workpiece. The virtual image of the component is disposed in a geometrically accurate location upon the video image of the workpiece.

A further embodiment includes identifying an accurate assembly of a component onto a workpiece to an operator using a laser projector and a headset. The laser projector projects laser images relative to the workpiece. A headset includes an imaging device and a display element. A location of the laser projector, the imaging device and the display element are registered in a common three dimensional coordinate system relative to the workpiece. The imaging device generates an image of a view of the workpiece appearing in the display element when viewed by the operator though the display element. A computer generated image of the component is overlaid upon the image of the workpiece being disposed in a geometrically accurate location on the image of the workpiece. The computer image of the component and the image of the workpiece appearing in the display element are registered to the three dimensional coordinate system defined relative to the workpiece.

The present invention is a significant enhancement to the use of laser projectors as assembly aids. For the first time, the benefits of laser projection relative to a workpiece are combined with an imaging device and a display device where a virtual image of a component to be assembled to the workpiece can be viewed by an operator. The accurate measurement made possible by a laser projector provides the ability to generate a three dimensional image of the component in a geometrically accurate location and orientation on a workpiece enabling an operator to both properly locate a component and to verify important features of that component spaced from a surface of the workpiece that are disposed in the geometrically accurate location.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 shows a computer aided design overlay with arbitrary laser alignment references;

FIG. 5 shows laser alignment references projected onto a workpiece using an optical measurement system;

FIG. 6 shows an alternative embodiment of the method of the present invention using a headset in the form of augmented reality goggles.

DETAILED DESCRIPTION

Figure 1:
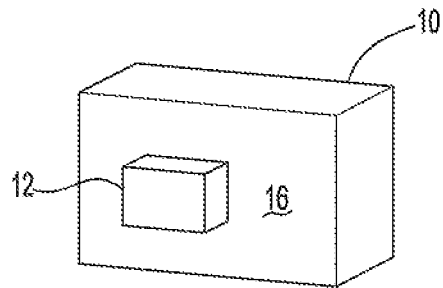
FIG. 1 represents a workpiece and a component of the workpiece.
Figure 2:
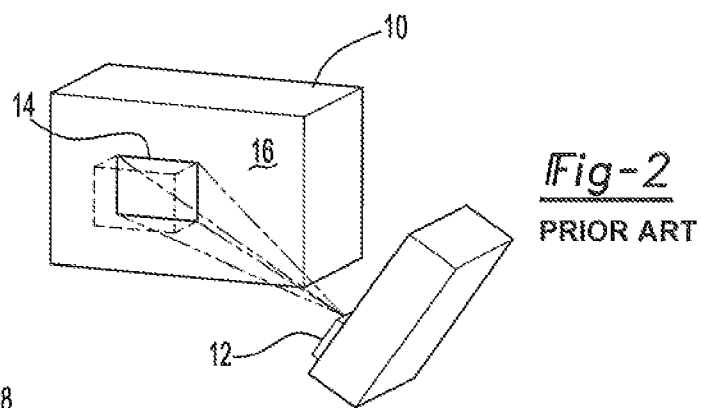
FIG. 2 represents a prior art laser projector projecting a template of the component upon the workpiece.
Figure 3:
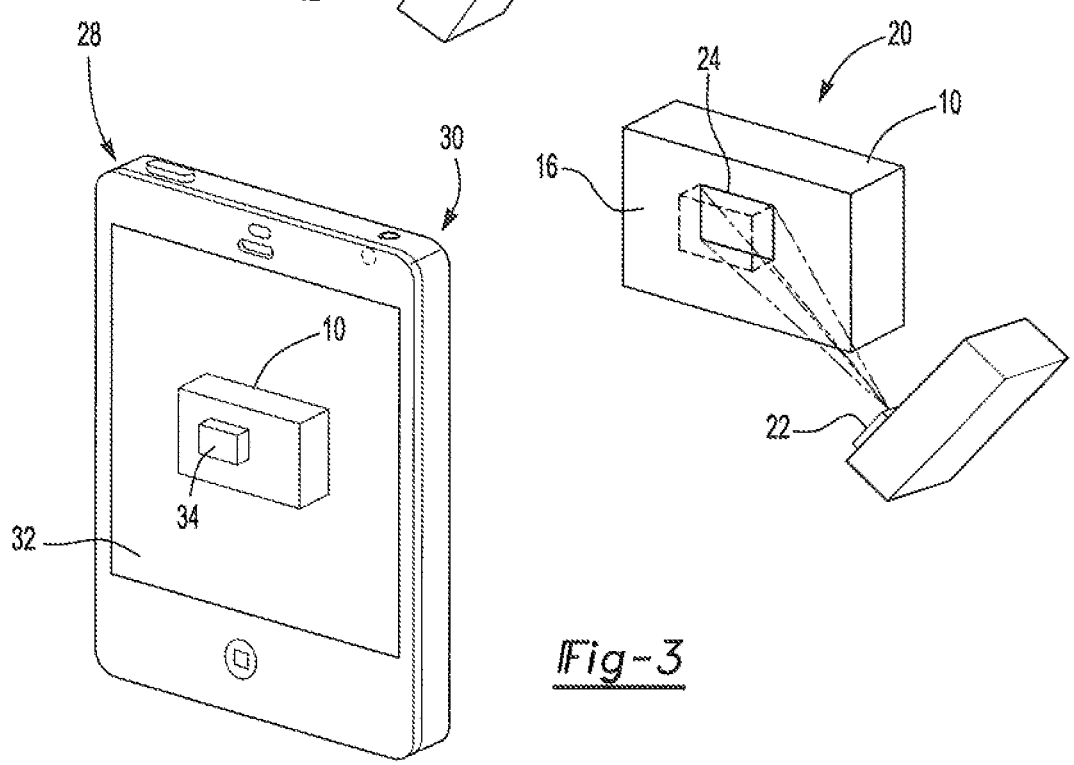
FIG. 3 represents a computer aided design overlay using laser alignment.
Figure 7:
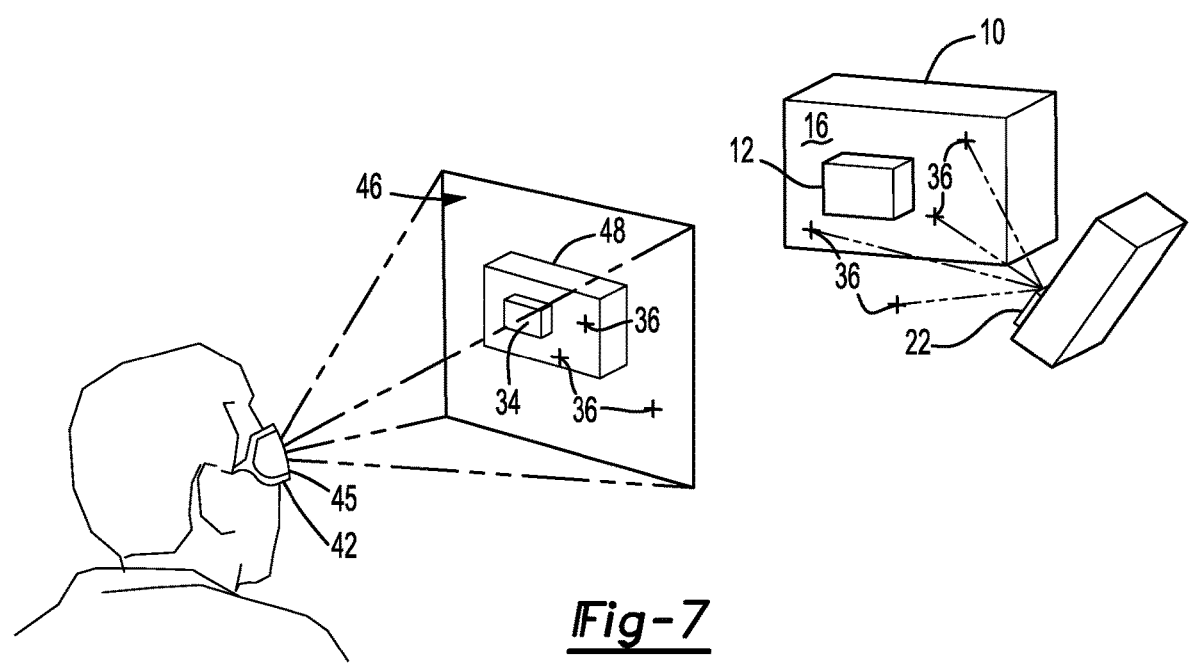
FIG. 7 shows a headset in the form of augmented reality goggles being used by an operator as further alternative embodiment of the present invention.

Referring to FIG. 3, a laser projection and video overlay assembly used to practice the method of the present invention is generally shown at 20. The workpiece 10 defines the surface 16 onto which the component 12 is assembled (represented in FIG. 1). A laser projector 22 projects a laser template 24 onto the surface 16 of the workpiece at geometrically relevant location.

A tablet 28 includes an imaging device 30 and a display device 32. As is understood by those of ordinary skill in the art, the imaging device on a tablet 28 takes the form of a camera and the display device 32 takes the form of a video screen. As is also known to those of ordinary skill in the art, the imaging device 30 is disposed upon on an opposite side of the table 28 from a display device 32. The description of a tablet is merely exemplary, and other devices are within the scope of this invention, including but not limited to, a smart phone, virtual reality apparatus, a headset including virtual reality or augmented reality goggles; separable cameras and video screens, and any device or combination of devices capable of both generating an image of the workpiece 10 and displaying an image of the workpiece 10. While "tablet" is used throughout the specification, it should be understood that each of these devices are within the scope of the invention.

In this embodiment, the laser template 24 is within the field of view of the imaging device 30 along with the workpiece 10. This creates the illusion that the display device 32 provides a window into the scene beyond the tablet 28. Further, in this embodiment, the tablet 28 includes a processor capable of performing necessary algorithms to monitor the projected template 24 and calculate the relevant view or viewpoint of the imaging device 30. Once registration of the view by the imaging device 30 is determined, a virtual overlay 34 based upon computer aided design ("CAD") is performed upon the live video stream of the workpiece 10. Further, even though the tablet 28 is moved, the processor continuously updates a geometric location of the workpiece 10 while simultaneously updating the video overlay 34 based upon the CAD models. As such, generally photo realistic renderings of the component 12 disposed at the desired location of an assembled component 12 is represented in the display device 32. The video overlay 34 of the present invention is not subject to the constraints of a projected template upon a surface 16 of a workpiece 10.

A further embodiment is shown generally at 34 of FIG. 4. During assembly, it is possible that a template 24 projected by the laser projector 22 could become occluded when the component 12 is placed onto the attachment location as indicated by the laser template 24. Therefore, the accuracy and usability of the overlay 34 could be reduced. In this embodiment, the laser projector 22 is programmed to project arbitrary laser spots 36 toward the workpiece 10. The imaging device 30 views the laser spots 36 and the processor registers the view of the imaging device 30 to accurately depict the overly 34 on the display device 32. The arbitrary projected pattern of at least four laser spots 36 is believed to provide the most accurate overlay 34. However, projecting additional laser spots 36 provides beneficial redundancy and enhances dynamic relocation of the video overlay 34. Additionally, continuous random projection of arbitrary laser spots 36 reduces the potential of occlusion by an operator or an assembled component 12 when mated to the workpiece 10.

It could be desirable to project laser spots 36 not only on the surface 16 of the workpiece, but also onto environmental surfaces to further facilitate accurate location of the workpiece 10 is disposed in a three dimensional coordinate system. Rapid, dynamic recalculation of the overlay 34 on the image of the workpiece 10 shown on the display device 32 is also achieved by the processor in this alternative embodiment to account for movement of the tablet 28 by an operator.

Additional enhancements are desirable when surfaces of the environment in which the workpiece 10 is disposed are unknown. In such circumstances, the use of a measuring device 38 is desirable as best represented in FIG. 5. In one such example, the measuring device 38 includes optical coordinate measuring using cameras 40 spaced apart a known distance to triangulate an image of each of the laser spot 36. In this manner, the measuring device 38 identifies an accurate location of the surface 16 of the workpiece 10 onto which the component 12 is to be mated. An additional enhancement makes use of placing retro-reflective targets onto the workpiece 10 at known locations or by using a hand held probe to measure reference features of the workpiece 10 as disclosed in U.S. Pat. No. 9,200,899, the contents of which are included herein by reference. Therefore, projected laser spots 36 can effectively be positioned arbitrarily to fall upon known or unknown workpiece 10 surfaces or other surfaces in the general environment, which will provide necessary visibility within the view of the imaging device 30.

The augmented or virtual reality provided by the present invention creates an illusion of a window or portal to an existing environment that is enhanced by CAD graphics onto a live video stream. While tablets and smart phones have been disclosed above, an additional embodiment, as represented in FIG. 6 includes video goggles 42 having an integrated imaging device 44. Many of these devices, now available in the market include processing capabilities and necessary sensors including, accelerometers and MEMS gyroscopes to rapidly register a video image and process CAD data to accurately generate augmented reality as set forth above. This provides the ability to introduce three dimensional graphic representations of a CAD generated component 12 that responds to movements of the tablet 28, projector 22 or other device at high frequency so that the virtual component 12 appears to be an integral part of the environment at a geographically accurate location on the workpiece 10.

The approaches set forth above provide a number of benefits over traditional laser template projection. Flicker restrictions are eliminated providing a high level of extensive detail, including fiber orientation, or even special instructions, all of which are overlaid on an image generated by the display device 32. Furthermore, visibility of outlines is not limited by reflectivity of background material. As such, a desired outline is always most visible feature on any graphic combination of color, blinking or other highlighting to convey features of a template outline by the display device 32. The use of augmented video images generated by a display device 32 are most effective when an application is particularly adapted to overcome potential awkwardness of remote viewing, and resolution of a video image. For example, direct laser projection for ply layup is extremely affective with proper imaging device location and orientation.

Still further enhancements are achievable by way of the IRIS™ Spatial Positioning System provided by Virtek Vision International, Inc. when additional degrees of accuracy might require restricting the field of view to a very local, often featureless area of a workpiece 10. The Spatial Positioning System enables any spot projected by the laser projector 22 that is measured by the measuring device 38 or spatial locator to become a reference to register the video stream with a high degree of accuracy.

An example includes attachment of a rectangular component 12 to a workpiece 10. In this example, the laser projector 22 projects both a template 24 and arbitrary laser spots 36 onto the workpiece 10 and surrounding environment. The virtual component 12, based upon CAD data, is overlaid on the actual attached part in the video stream on the display device 32, by registering the imaging device 30 from the arbitrary laser spots 36 as long as the laser spots 36 remain in view of the display device 32. Of course, the arbitrary laser spots 36 are also located by the Spatial Positioning System, which allows the laser or laser to rapidly reposition the reference locations to maintain the arbitrary laser spots 36 in view of the imaging device 30. In this manner, movement of the tablet, smartphone or goggles becomes irrelevant because the registration is maintained to achieve accurate augmentation.

It should be understood by those of ordinary skill in the art that the description set forth above, while disclosing apparatus and methods for accurately locating a component 12 onto a workpiece 10, includes broader aspects of the apparatus and method are included. For example, the laser projection and video overlay assembly 20 disclosed above provide the ability to identify accurate location of a drilled or machined aperture (not shown) into the workpiece. Further, the laser projection and video overlay assembly 20 identify to an operator whether the correct component 12, fastener or the like has been assembled to the workpiece 10.

An additional aspect of the present invention is the ability to obscure laser spots 36 or other laser images projected by the laser projector 22. In some instances, the laser spots 36 could cause confusion, or otherwise be undesirable when shown in the display device 32. One example is if the virtual overlay 34 is used for entertainment purposes. In this example, reduces the impact of the virtual overlay 34. In the case, the tablet 28 is programmed to obscure the laser spots 36.

The use of goggles 42 or headset including goggles presents another challenging aspect in generating a video overlay of the component 12 on the workpiece 10 in a geometrically accurate location as defined by a three dimensional coordinate system relative to the workpiece 10. "Goggles" and "headset" are used interchangeably throughout the specification and it should be understood that the term "goggles" includes a device worn over an operator's eyes and any device that is worn over an operators head providing a hands free viewing feature or display device 45. Because there is no way to calibrate a perspective of an operator wearing the goggles 42, a unique method of registering the video overlay 34 of the component 12 on the workpiece 10 has been developed. In addition, shifts in placement of the goggles 42 on the operators head are also removed from disrupting accuracy of the video overlay 34 of the component when perceived by the operator.

As is explained in detail herein above, the goggles 42, and more specifically, the integrated imaging device 44 are registered to the workpiece 10 by the laser projecting the laser images 36 generated by the laser projector 22. Once the integrated imaging device 44 is registered to the workpiece 10 by detecting a pattern of the laser images 36 projected toward and onto the workpiece 10, the video overlay 34 of the component 12 is generated by the goggle display element 45. While the video overlay 34 generated by the goggle display element 45 is registered accurately to the workpiece 10 in the goggle display element 45, the location of the video overlay 34 may be skewed when perceived by the operator. However, the operator perception is sufficient to locate where to place the component 12 on the workpiece 10 in a generally accurate location as defined by computer generated graphical design. In addition, the goggles 42 include an environmental tracking feature for further accuracy as provided by such HoloLens® systems sold by Microsoft Corporation.

The environmental tracking feature includes a sensor or plurality of sensors that cooperate with the imaging device 44 to generate three dimensional range images and track three dimensional configuration of the environment along with inertial monitoring to monitor dynamic movement and orientation of the goggles 42. For further accuracy, the imaging device 44 may include more than one camera and even four cameras to generate accurate three dimensional range images. Furthermore, the dynamic movement is unpredictable movement of the goggles 42 as would be expected of movement of the operator's head. However, real time updates of the three dimensional range images and inertial monitoring are sufficient to determine the general or approximate location of the component. Otherwise, the virtual view 46 removes the necessity of precisely locating the goggles 42 relative to the workpiece 10 because the video stream of the a view includes the laser images 36 providing references for location of the video overlay 34 relative to the virtual workpiece 48.

Once general placement of the component 12 onto the workpiece 10 is achieved, the operator triggers a virtual view 46, or mixed reality view of the workpiece 10 and of the component 12. The virtual view 46 is a live stream, real time video image of the workpiece 10 generated by the display element 45 as viewed by the operator while wearing the goggles 42. In one embodiment, the virtual view 46 is disposed in space between the operator and the actual workpiece 10 in the line of sight of the operator. In another embodiment, the virtual view 46 is disposed in space offset from the workpiece 10.

The video overlay 34 of the component 14 in the virtual view 46 is precisely registered on the virtual workpiece 48 as the workpiece is represented in the virtual view 46. By registering the video overlay 34 of the component 14 on a virtual workpiece 48 as displayed in the virtual view 46, the inaccuracy of operator perception is completely removed and very small assembly tolerances are achievable. The video overlay 34 is an electronically generated image of the component 12 located in a geometrically accurate position on the virtual workpiece 48. The video overlay 34 provides visual indication of where the component 12 is to be placed during the assembly process.

Following placement of the component 12, the video overlay provides information to the operator as to whether the component 12 has been placed properly on the workpiece 10. Optimal placement of the virtual view 46 to most closely match the operator's viewpoint is determined automatically through registration of the goggles 42 from the laser spots 36 and environmental tracking feature without requiring trial and error by an operator holding an actual device. Further, the virtual view 46 does not obscure projection patters of the laser spots 36 further facilitating registration of the goggles 42 to the workpiece 10. The real time video stream of the workpiece 48 also includes a video image of the laser images 36 enabling registration of the video overlay 34 to the virtual workpiece 48 as seen in the virtual view 46.

Additional alignment feedback is available through generation of a CAD image of the component 12 in the virtual view 46. In the display, the CAD image could be "ghosted" in a properly aligned position on the virtual workpiece 46. However, it is believed that virtual alignment of the video overlay 34 on the virtual workpiece 48 is achievable merely by way of detecting the laser images 36 and that a CAD overlay is not necessary.

The environmental tracking feature of the goggles 42 provides assistance to the laser projector 22 for projecting the laser spots 36 within the field of view of the goggles 42. As described in more detail herein above, the environmental tracking feature updates the view of the goggles 42 (and therefore the operator) in real time and signals the view to the laser projector 22. The laser projector 22 makes use of information received from the environmental tracking feature to constantly update the position and direction of the integrated imaging device 44 of the goggles 42 to optimize projection of the pattern of laser spots 36. The environmental tracking feature, in one embodiment, is a computer interpretation of the scene viewed by the operator.

To provide further clarity to the operator, the virtual view 46 is cropped and sized to the actual view of the workpiece 10 of the operator. Therefore, dimensionally, the image of the workpiece 48 is the same size as the actual workpiece 10 when perceived by the operator so that edges and relevant features are equivalently spaced.

Once the operator has placed the component 12 onto the workpiece 10, proper placement is verified by a controller or computer (not shown) used to generate the virtual image. The overlay of the component 34 as defined by the computer design of the component/workpiece assembly 20 is compared or aligned with actual placement of the component 10. Edges, datum and relevant features of the overlay 34 of the component and the placed component 12 can be compared to verify accurate placement either visually by the operator or by the computer. Precise registration of the virtual workpiece 48 in the virtual view 46 is detected by the imaging device 44 providing an indication to the operator where the component 12 should be placed on the workpiece 10. A frame capture of the component 12 placement on the workpiece 10 can be recorded as in a database provided proof of proper component 12 placement. In addition, the image, in another embodiment, is processed by the computer to compare the expected location of the component 12 as designed, with the observed image features of the component.

Obviously, many modifications and variations of the present invention are possible in light of the above teachings. The foregoing invention has been described in accordance with the relevant legal standards; thus, the description is merely exemplary than limiting in nature. Variations and modifications to the disclosed embodiment may become apparent to those skilled in the art and do come within the scope of this invention. Accordingly, the scope of a legal protection afforded this invention can only be determined by studying the following claims.

What is claimed is:

1. A method of identifying an accurate assembly of a component onto a workpiece to an operator, comprising the steps of:
   providing a laser projector for projecting laser images relative to the workpiece;
   providing a headset for the operator with said headset including an imaging device and a display element;
   registering a location of said laser projector, said imaging device and said display element in a three dimensional coordinate system relative to the workpiece by said imaging device detecting the laser images;
   said imaging device generating a virtual image of a view of the workpiece appearing in said display element when viewed by the operator though the display element;
   overlaying a computer generated image of the component upon the virtual image of the view of the workpiece generated by the imaging device with the computer generated image of the component being disposed in a geometrically accurate location on the image of the workpiece;
   registering the image of the workpiece appearing in the display element to the three dimensional coordinate system defined relative to the workpiece.

2. The method set forth in claim 1, including a step of generating an image of the view of the workpiece at a location disposed between the workpiece and the display element.

3. The method set forth in claim 1, further including a step of providing said headset with an environmental tracking feature.

4. The method set forth in claim 3, further including a step of said environmental tracking feature signaling said laser projector with a position and view of said imaging device of said headset.

5. The method set forth in claim 1, registering a location of said laser projector, said imaging device and said display element in a three dimensional coordinate system relative to the workpiece is further defined by said laser projector projecting laser images toward said workpiece and said imaging device detecting a pattern of the laser images.

6. The method set forth in claim 1, further including a step of updating the image of the workpiece displayed by said display element in real time thereby maintaining the overlay of the computer generated image of the component in a dimensionally accurate geometrical location relative to the workpiece.

7. The method set forth in claim 1, further including a step of cropping and scaling the image of the view appearing in the display element to match the operator's geometric view of the workpiece.

8. The method set forth in claim 1, further including a step of said display element generating a video overlay of the component on the workpiece at preliminary location prior to aligning the computer generate image of the component on a geometrically accurate location on the image of the workpiece.

9. The method set forth in claim 1, further including a step of verifying correct placement of the component on the workpiece by comparing a placement of the component on the workpiece with computer generated image of the component disposed in a geometrically accurate location of the image of the workpiece.

10. The method set forth in claim 9, wherein said step of verifying correct placement of the component on the workpiece is further defined by aligning an image of the component placed upon the workpiece with the computer generated image of the component overlaid on the image of the workpiece.

11. A method of identifying an accurate assembly of a component onto a workpiece to an operator, comprising the steps of:
   providing a laser projector for projecting laser images relative to the workpiece;
   providing a headset for the operator with said headset including an imaging device, an environmental tracking feature and a display element;
   registering a location of said laser projector, said imaging device and said display element in a three dimensional coordinate system relative to the workpiece by said imaging device detecting the laser images;
   said environmental tracking feature signally said laser projector with a position and view of said imaging device of said headset;
   said imaging device generating an image of a view of the workpiece appearing in said display element when viewed by the operator though the display element;
   overlaying a computer generated image of the component upon the with the computer generated image of the component being disposed in a geometrically accurate location on the image of the workpiece;
   registering the image of the workpiece appearing in the display element to the three dimensional coordinate system defined relative to the workpiece.

12. The method set forth in claim 1, including a step of generating an image of the view of the workpiece at a location disposed between the workpiece and the display element.

13. The method set forth in claim 1, registering a location of said laser projector, said imaging device and said display element in a three dimensional coordinate system relative to the workpiece is further defined by said laser projector projecting laser images toward said workpiece and said imaging device detecting a pattern of the laser images.

14. The method set forth in claim 1, further including a step of updating the image of the workpiece displayed by said display element in real time thereby maintaining the overlay of the computer generated image of the component in a dimensionally accurate geometrical location relative to the workpiece.

15. The method set forth in claim 1, further including a step of cropping and scaling the image of the view appearing in the display element to match the operator's geometric view of the workpiece.

16. The method set forth in claim 1, further including a step of said display element generating a video overlay of the component on the workpiece at preliminary location prior to aligning the computer generate image of the component on a geometrically accurate location on the image of the workpiece.

17. The method set forth in claim 1, further including a step of verifying correct placement of the component on the workpiece by comparing a placement of the component on the workpiece with computer generated image of the component disposed in a geometrically accurate location of the image of the workpiece.

18. The method set forth in claim 9, wherein said step of verifying correct placement of the component on the workpiece is further defined by aligning an image of the component placed upon the workpiece with the computer generated image of the component overlaid on the image of the workpiece.

* * * * *